United States Patent [19]

Altpeter et al.

[11] Patent Number: 5,019,740
[45] Date of Patent: May 28, 1991

[54] COLLECTOR SEGMENT

[75] Inventors: Arno Altpeter, Sindelfingen; Carsten Bauer, Stuttgart, both of Fed. Rep. of Germany

[73] Assignee: Robert Bosch GmbH, Stuttgart, Fed. Rep. of Germany

[21] Appl. No.: 425,049

[22] Filed: Oct. 20, 1989

[30] Foreign Application Priority Data

Dec. 19, 1988 [DE] Fed. Rep. of Germany ... 8815711[U]

[51] Int. Cl.⁵ .......................................... H02K 13/04
[52] U.S. Cl. ..................... 310/234; 310/42; 310/219; 310/233
[58] Field of Search ............... 310/233, 234, 235, 236, 310/237, 219, 42, 261

[56] References Cited

U.S. PATENT DOCUMENTS 2,899,574  8/1959  Jungk ................................. 310/234
4,342,933  8/1982  Gerlach .............................. 310/234
4,670,971  6/1987  Allen ................................. 310/234

FOREIGN PATENT DOCUMENTS 0600822   8/1934  Fed. Rep. of Germany ...... 310/236
0749991   5/1944  Fed. Rep. of Germany ...... 310/234
2739730   3/1978  Fed. Rep. of Germany .
3017426  11/1981  Fed. Rep. of Germany .
0135302  10/1979  Japan ................................... 310/42
0293954  12/1987  Japan ................................. 310/233
0274345  11/1988  Japan ................................. 310/234
2202095   1/1988  United Kingdom ............... 310/234

*Primary Examiner*—R. Skudy
*Attorney, Agent, or Firm*—Michael J. Striker

[57] ABSTRACT

A collector segment comprising a connector lug having a contact surface, to which a wire winding loop of electric machine rotor is to be welded, and extending in a direction radially outward relative to a rotational axis of the electric machine rotor, and positioning surfaces which define a position of the wire winding loop in an extension direction of the connecting lug.

6 Claims, 1 Drawing Sheet

COLLECTOR SEGMENT

BACKGROUND OF THE INVENTION

The invention relates to a collector segment at an end of which there is provided a contact surface to which a loop of a wire winding of an electric machine rotor is to be welded, preferably, by ultrasound welding. DE-OS 2,739,730 discloses a method of manufacturing of an armature of a dynamoelectrical machine according to which, contact elements of the armature winding are electrically and mechanically connected with collector segments by ultrasound welding. According to the method disclosed in DE-OS 2,739,730, conductors are secured by ultrasound welding either to the connecting ends of brush bearing surfaces or to, provided for this purpose, extension of the contact surface in segment recesses. Another method of providing as electrical contact so a mechanical connection of an armature winding with a collector segment is disclosed in DE-OS 3,017,426. DE-OS 3,017,426 also discloses using the ultrasound welding. According to the method disclosed in DE-OS 3,017,426, the collector segments are rolled on a contact surface of a sonotrode. Upon connection with segment hooks, the hooks that support wire winding loops, upon being rolled on by the sonotrode, are bent in the direction of the segment extension and are welded to the segments. The segment hooks should be made from a well-deformable material. To weld the hooks with segments, a considerable amount of heat is required. The heat can cause a thermal breakdown of the insulating material of the collector collar.

SUMMARY OF THE INVENTION

The object of the invention is to provide a collector segment that would enable a strong mechanical connection between a wire winding loop and the segment contact surface and which connection would be able to withstand high load and would have a small contact resistance. The object of the invention is achieved by providing the connector segment with a connecting lug extending radially outward relative to the rotational axis of the electric machine rotor, and two positioning surfaces which define a position of the wire winding loop in an extension direction of the lug and are associated with the connecting lug. The positioning surfaces define the position of the wire winding loop with respect to the sonotrode of the ultrasound welding apparatus. The proper positioning of the wire winding loop with respect to the sonotrode insures good quality of weld joints at predetermined welding parameters and, thus, a reliable connection. The segments themselves can be made of a brittle conductive material as they themselves are not subjected to any essential deformation and, thus, are not subjected to any danger of breaking.

According to a preferred embodiment of the invention, the positioning surfaces are formed on narrow sides of the connecting lug and support the legs of the wire winding loop. The manufacture of the collector segments is substantially simplified when the positioning surfaces are formed as one-sided support surfaces for supporting the legs of the wire winding loop. The positioning surfaces can further be inclined in the direction of the longitudinal axis of the electric machine rotor in such a manner that extensions of the positioning surfaces intersect the longitudinal axis at an acute angle. The segment contact surface is formed on the connecting lug which also has an outer surface extending substantially parallel to the contact surface. The outer surface of the connecting lug is supported on a support anvil during welding. This has an advantage that the ultrasound energy is applied at a location spaced from the insulation material of the collector collar. This arrangement also prevents breaking of the connection of the segment with the wire winding loop during welding.

The present invention both as to its construction so to its method of operation, together with additional objects and advantages thereof, will be best understood from the following detailed description of specific embodiments when read in connection with the accompanying drawings.

DESCRIPTION OF THE PREFERRED EMBODIMENT

Figure 1:
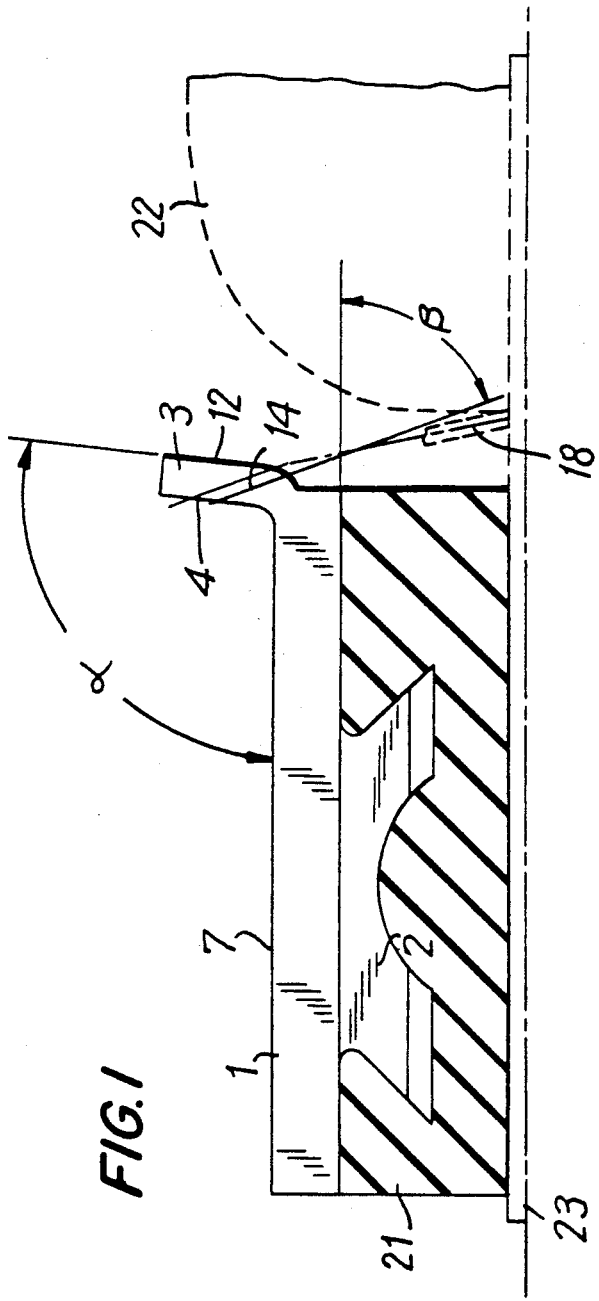
FIG. 1 shows a side view of a collector segment according to the invention.

FIG. 1 shows a collector segment 1 having a foot 2 by which the collector segment is to be connected with a collector collar 21 made of an insulating material. The collar is fixedly connectable for joint rotation with an electric machine rotor 22. The segment 1 has at one of its ends a connecting lug 3. The connecting lug 3 has a contact surface 4 to which a loop 5 of a wire winding 6 is connected. The connecting lug 3, which extends radially outward relative to the rotational axis 23 of the electric machine rotor, forms with a brush contact surface 7 of the collector segment 1 an angle of 90° or an angle of somewhat more than 90°. Mechanical and electrical contacts of the loop 5 of the wire winding 6 with the connecting lug 3 in the area of the lug contact surface 4 is achieved by ultrasound welding.

For effecting the ultrasound welding, a sonotrode 8 is used. The sonotrode 8 has a surface 9 which abuts the loop 5. The surface 9 extends somewhat parallel to a support surface 11 formed on an anvil 10. The connecting lug has an outer surface 12 which extends parallel to the contact surface 4 and lies on the support surface 11 during welding. The anvil prevents transmittal of force P acting on the sonotrode to the commutator collar. Also, the anvil 10 dampens vibrations of the sonotrode in directions indicated by the double arrow 20 which vibration may loosen the collector segment connection. The vibrations advantageously are effected in the plane of the drawing.

Figure 2:
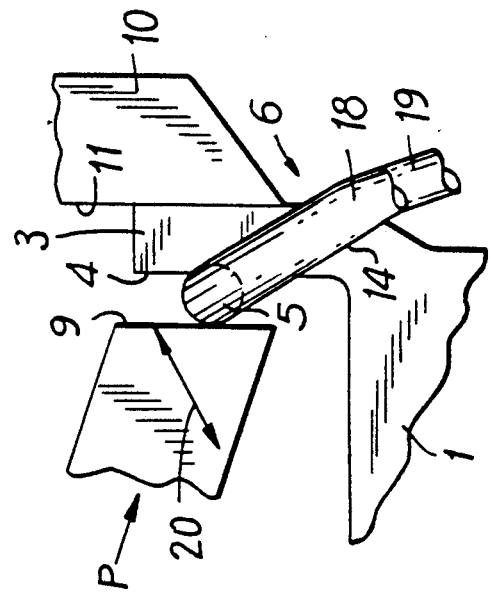
FIG. 2 shows a connecting lug of the collector segment according to the invention with a winding wire loop connected with a portion of an ultrasound welding apparatus for connecting the loop with a contact surface of the lug.
Figure 3:
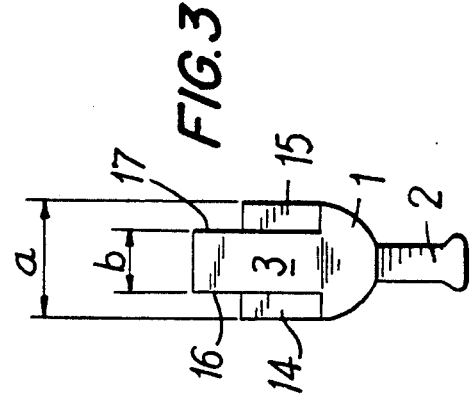
FIG. 3 shows a front view of a collector segment of an armature packet (not shown).

The connecting lug 3 is provided with positioning surfaces 14 and 15 which insure a predetermined height level of the loop 5 beneath the sonotrode 8. The positioning surfaces 14 and 15 define the position of the loop 5 in a longitudinal or extension direction of the connecting lug 3. The positioning surfaces 14 and 15, according to the invention, are provided on narrow sides 16 and 17 of the connecting lug 3 in such a manner that they define the position of two legs 18 and 19 of the wire loop 5 and, thereby, the contact position on the contact surface 4 of the connecting leg 3. The positioning surfaces 14 and 15, due to respective deformation thereof, provide support surfaces for the wire loop legs 18 and 19. To this end, an initial width "a" of the connecting lug 3 is reduced to a width "b", i.e., by double-sided stamping so that the support or positioning surfaces 14 and 15 form transition surfaces between widths "a" and "b" of the connecting lug 3. The support or positoning surfaces are so inclined relative to the longitudinal axis of the segment 1 and, thus, relative to the rotational axis of the rotor of the electrical machine, that the extensions of these support or positioning surfaces intersect the longitudinal axis of the segment 1 at an acute angle. Thereby, as shown in FIG. 2, the outer surface of the connecting lug 3 can abut along a substantial portion of its length the anvil 10.

As it has already been indicated, the connecting lug 3 can be inclined relative to the longitudinal axis of the collector segment. This results in that the angle between the contact surfaces 4 and brush contact surface 7 of the connecting lug 3 is somewhat greater than 90°. Upon mounting of the collector in the welding apparatus, each segment 1 will be biased into engagement with the anvil 10 with such a force that the angle between the contact and brush surfaces would be reduced to 90°. Because of a predetermined positioning of the connecting lug 3 on the anvil 10, repeated reproduction of results of the welding is insured.

Instead of the above described one-sided support surfaces for both legs 18 and 19 of the wire loop 5, the recesses having a form of slots or the like formed on the narrow sides of the connecting lug and/or the contact surface 4 can serve as the positioning surfaces. Essential is that the wire loop occupies a predetermined height level relative to the connecting lug 3 and thereby, relative to the electrode. The surfaces 14 and 15 determine the position of the wire coil 5 in such a manner that its legs are supported on the support or positioning surfaces 14 and 15, and the curved portion thereof is supported on the contact surface 4 of the connecting lug 3. It is contemplated that the connection between the wire loop 5 and the contact surface 4 can be also achieved by welding.

The ultrasound energy in the area of the loop 5 is applied directly to the wire 6. This results in heating of the wire and the connecting lug only until the wire is deformed under breaking of its insulation and forms a welding joint with the contact surface 4 of the connecting lug. As a result, the segment 1 and the collector collar would not be substantially thermally loaded. The position of the wire loop 5 is determined by positioning or support surfaces 14 and 15 and is in the middle of the friction surface 9 of the sonotrode 8. This prevents sliding of the loop 5 downwards and gripping it by the sonotrode 8.

While the invention has been illustrated and described as embodied in a collector segment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A collector segment comprising a connecting end having a contact surface to which a loop of a wire winding of an electric machine rotor is to be welded; and a connecting lug extending radially form said collector segment in a direction opposite to a direction of a rotational axis of the electric machine rotor, said connecting lug having two opposte flat narrow sides extending substantially transverse to said contact surface, and two positioning surfaces formed on said two opposite flat narrow sides for defining a position of the wire winding loop in an extension direction of said connecting lug to thereby provide for a reliable welded connection between the wire winding loop and said contact.

2. A collector segment as set forth in claim 1, wherein said connecting lug has two opposite narrow sides defining said two positioning surfaces, which positioning surfaces are designed for supporting two legs of the wire winding loop.

3. A collector segment as set forth in claim 2, wherein said two positioning surfaces are formed as one-sided support surfaces.

4. A collector segment as set forth in claim 2, wherein said two positioning surfaces are inclined in the direction of the rotational axis of the electric machine rotor in such a manner that an extension of each of said positioning surfaces intersects the rotational axis at an acute angle.

5. A collector segment as set forth in claim 1, wherein said contact surface is formed on said connecting lug, said connecting lug including an outer face extending substantially parallel to said contact surface.

6. A collector segment as set forth in claim 5, wherein said collector segment has a longitudinal axis, and an angular position of said connecting lug relative to the longitudinal axis of said collector segment being determined by said outer surface of said connecting lug which extends substantially at a right angle to the rotational axis of the electric machine rotor.

* * * * *